(12) United States Patent
Takatori

(10) Patent No.: US 8,040,814 B2
(45) Date of Patent: Oct. 18, 2011

(54) RELAY APPARATUS, CONDUCTION CONFIRMATION METHOD THEREOF AND CONDUCTION CONFIRMATION CIRCUIT

(75) Inventor: Ko Takatori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 262 days.

(21) Appl. No.: 12/559,599

(22) Filed: Sep. 15, 2009

(65) Prior Publication Data

US 2010/0002705 A1 Jan. 7, 2010

Related U.S. Application Data

(63) Continuation of application No. PCT/JP2007/055428, filed on Mar. 16, 2007.

(51) Int. Cl.
*H04L 12/42* (2006.01)
(52) U.S. Cl. ........ 370/249; 370/252; 370/389; 370/392; 370/404; 709/251
(58) Field of Classification Search .................. None
See application file for complete search history.

(56) References Cited

U.S. PATENT DOCUMENTS

| | | | |
|---|---|---|---|
| 7,706,258 B2* | 4/2010 | Elie-Dit-Cosaque et al. | 370/224 |
| 2004/0160904 A1* | 8/2004 | Enomoto et al. | 370/256 |
| 2005/0076140 A1* | 4/2005 | Fung | 709/245 |
| 2005/0207348 A1 | 9/2005 | Tsurumi et al. | |
| 2008/0279181 A1 | 11/2008 | Shake et al. | |
| 2009/0052317 A1* | 2/2009 | Takagi et al. | 370/223 |
| 2010/0182914 A1* | 7/2010 | DelRegno et al. | 370/249 |
| 2010/0226260 A1* | 9/2010 | Zinjuvadia et al. | 370/248 |

FOREIGN PATENT DOCUMENTS

| | | |
|---|---|---|
| JP | 2004-336375 | 11/2004 |
| JP | 2004-364065 | 12/2004 |
| JP | 2005-102157 | 4/2005 |
| JP | 2005-269059 | 9/2005 |

OTHER PUBLICATIONS

International Search Report dated May 15, 2007, from the corresponding International Application.
International Preliminary Report on Patentability and Written Opinion of the International Searching Authority dated Sep. 29, 2009, from the corresponding International Application.

\* cited by examiner

*Primary Examiner* — Hassan Phillips
*Assistant Examiner* — Duc Duong
(74) *Attorney, Agent, or Firm* — Katten Muchin Rosenman LLP

(57) ABSTRACT

The relay apparatus relays frames in which a plurality of network identifiers are set and comprises a frame determining unit, a converting unit, and a sending unit. The frame determining unit determines whether a frame received at a communication port is a specific frame or not. The converting unit converts, when it is determined that the received frame is a specific frame and when the communication port is a blocking port, a network identifier set in the specific frame to another network identifier among the plurality of network identifiers. The sending unit sends the specific frame, the network identifier of which has been converted by the conversion unit, from a port opposing the communication port.

8 Claims, 13 Drawing Sheets

FIG. 5

| INDEX | IN-USE VLAN ID | PORT NUMBER | BLOCKING PORT NUMBER |
|---|---|---|---|
| 1 | 1000 | #1、#2 | #1 |
| 2 | 1001 | #1、#2 | #1 |
| . | . | . | . |
| . | . | . | . |
| . | . | . | . |
| 2001 | 2000 | #1、#2 | #1 |
| 2002 | 0xFFFF (END FLAG) | — | — |

FIG. 6

| PORT NUMBER | RING NETWORK NUMBER |
|---|---|
| #1 | 1 |
| #2 | 1 |
| #3 | – |
| #4 | 2 |
| #5 | 2 |

FIG. 10

| VLANID | IN-USE FLAG (0=NOT USED, 1=IN-USE) | PORT NUMBER | BLOCKING PORT NUMBER |
|---|---|---|---|
| 1 | 0 | — | — |
| 2 | 0 | — | — |
| ... | ... | ... | ... |
| 999 | 0 | — | — |
| 1000 | 1 | #1, #2 | #1 |
| 1001 | 1 | #1, #2 | #1 |
| ... | ... | ... | ... |
| 2000 | 1 | #1, #2 | #1 |
| 2001 | 0 | — | — |
| ... | ... | ... | ... |
| 4093 | 0 | — | — |
| 4094 | 0 | — | — |

RELAY APPARATUS, CONDUCTION CONFIRMATION METHOD THEREOF AND CONDUCTION CONFIRMATION CIRCUIT

CROSS-REFERENCE TO RELATED APPLICATIONS

This is a continuation of Application PCT/JP2007/055428, filed on Mar. 16, 2007, now pending, the contents of which are herein wholly incorporated by reference.

FIELD

The present invention relates to a relay apparatus disposed in a network segmented into a plurality of virtual networks, and particularly to a technology for confirming a conduction with respect to the plurality of virtual networks.

BACKGROUND

In Ethernet (registered trademark) network, there is a case of taking a ring network topology in which bridge apparatuses are connected in a ring-shape. This topology enables a physical redundant route to be provided between arbitrary bridge apparatuses on the network and enables network reliability to be enhanced.

In the Ethernet (registered trademark) network having the ring network topology, however, such a phenomenon occurs that a data frame is permanently circulated with the result that normal communications can not be performed. An STP (Spanning Tree Protocol), a ring protocol, etc are utilized for preventing this type of phenomenon. The STP is a protocol for providing a logical route tree by transferring and receiving a control packet named BPDU (Bridge Protocol Data Unit) between the bridge apparatuses on the basis of given priority levels. According to the STP, on the occasion of generating the tree, a port of the bridge on an unselected route is logically blocked. With this scheme, a data frame relay route between the arbitrary bridge apparatuses is uniquely determined.

FIG. 12 is a view illustrating an example of an operation of the ring protocol. FIG. 12 depicts a ring network 1 in which bridges 11, 12, 13 and 14 are connected in the ring-shape. The ring protocol is implemented in the ring network 1, where a port of the bridge 12, with which the bridge 11 connects, is blocked. The data frame sent to a user B from a user A is thereby forwarded uniquely on a route such as the bridge 12-the bridge 14-the bridge 13. On the other hand, if a fault occurs within the network, the communications resume on a route where any fault does not occur by dynamically changing the blocking point.

By the way, a VLAN (Virtual Local Area Network) technology is exemplified as a technology of configuring the network like this as a virtual network that is not limited by a physical topology. In the VLAN, a plurality of virtual networks (broadcast domains) are formed by segmenting a broadcast domain owing to a function of a switch device (a layer-3 switch, a layer-2 switch, etc). Further, the VLAN is classified into several categories such as a port-base VLAN and a tag VLAN, in which virtual network configuring methods are different. The tag VLAN is of a technology standardized by IEEE802.1Q, wherein one single port of the switch device can belong to a plurality of virtual networks by adding a 4-byte VLAN tag field to an Ethernet (registered trademark) frame.

FIG. 13 is a diagram illustrating a frame format of the tag VLAN specified by IEEE802.1Q. The VLAN tag field is added to between a source address field and a type field, and contains a tag protocol identifier (TPID: Tag Protocol IDentifer) and tag control information (TCI: Tag Control Information). A 12-bit VLAN identifier (which will hereinafter be abbreviated to VLAN ID) is set in the TCI. The VLAN ID is information for identifying the segmented virtual networks, in which numeral values of 1 through 4094 are specified as usable values.

In a ring network where the tag VLAN is implemented, a technique of periodically confirming normality of forwarding a data frame involves using a technique of periodically transmitting and receiving a conduction confirmation frame. As for the VLAN ID of this conduction confirmation frame, there are a technique (conventional technique 1) of setting the VLAN ID specially prepared for the conduction confirmation and a technique (conventional technique 2) of setting an VLAN ID being used.

Note that the conventional techniques related to the invention of the present application are disclosed in the following documents. Patent document 1 given below discloses a packet forwarding method for actualizing an uninterrupted switching function by generating a copy of the packet when a fault occurs, transferring those separately on different routes and forwarding any one of the two packets on the receiving side. The Patent document 1 is Japanese Patent Laid-Open Publication No. 2005-102157.

SUMMARY

The conventional techniques 1 and 2 described above have, however, a problem that the conduction confirmation can be done for the virtual network associated with the VLAN ID set in the conduction confirmation frame but can not be done for the virtual network associated with a different VLAN ID. The conventional techniques 1 and 2 are effective check methods in the case of a physical fault such as a damage to a communication cable (cutoff of the cable) and a fault affecting all of the virtual networks (VLAN IDs) but can not be said to be the effective check methods in the case of a fault which occurs in only a specified virtual network.

In order to solve this problem, such a technique is considered that the conduction confirmation frames in which the in-use VLAN IDs are set are generated corresponding to the number of all the in-use VLAN IDs and transmitted simultaneously.

The VLAN ID, however, can take the numeral value "4094", and hence It is preferred that 4094 pieces of conduction confirmation frames at the maximum are generated on a one-by-one basis, which is not realistic because of a tremendous number of steps being necessary for the conduction confirmation.

According to an aspect of the invention, a relay apparatus, which relays frames in which a plurality of network identifiers for identifying a plurality of virtual networks are set in order to configure the plurality of virtual networks, includes: frame determining unit for determining whether a frame received at a communication port is a specified frame or not; converting unit for converting, when determining that the received frame is the specified frame and that the communication port is a blocking port, the network identifier set in the specified frame into another network identifier of the plurality of network identifiers; and transmitting unit for transmitting the specified frame with the network identifier translated by the converting unit from a port opposite to the communication port.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 5 is a diagram illustrating an example of a structure of a VLAN ID management table;

FIG. 6 is a diagram illustrating an example of a structure of a port management table 26;

FIG. 10 is a diagram illustrating a modified example of the VLAN ID management table;

DESCRIPTION OF EMBODIMENTS

A conduction confirmation system according to an embodiment will hereinafter be described with reference to the drawings. A configuration in the following embodiment is an exemplification, and the present invention is not limited to the configuration in the embodiment.

Embodiment

System Architecture

To begin with, a system architecture (a network configuration (topology)) of a conduction confirmation system in an embodiment will be discussed. The network configuration of the conduction confirmation system in the embodiment takes the same configuration as in the network model illustrated in FIG. 12, which has been described in the section [Background Art].

To be specific, the conduction confirmation system in the embodiment includes a plurality of bridge apparatuses (which will hereinafter be simply referred to as bridges) 11, 12, 13 and 14.

The respective bridges are connected to each other in a ring-shape, thereby configuring a ring network 1. Note that the present invention does not limit the relay apparatuses building up the conduction confirmation system to the bridges (layer-2 switches), and the relay apparatus, if a function related to a tag VLAN is implemented, may be constructed of a layer-3 switch.

In the network 1, a plurality of virtual networks is configured by implementing the tag VLANs with the functions of the respective bridges. VLAN IDs (1000 through 2000) are set in the respective virtual networks. The following discussion proceeds with this VLAN ID group on the assumption that a port of the bridge 12, with which the bridge 11 connects, is blocked by a ring protocol etc.

Outline of System Operation

Figure 1:
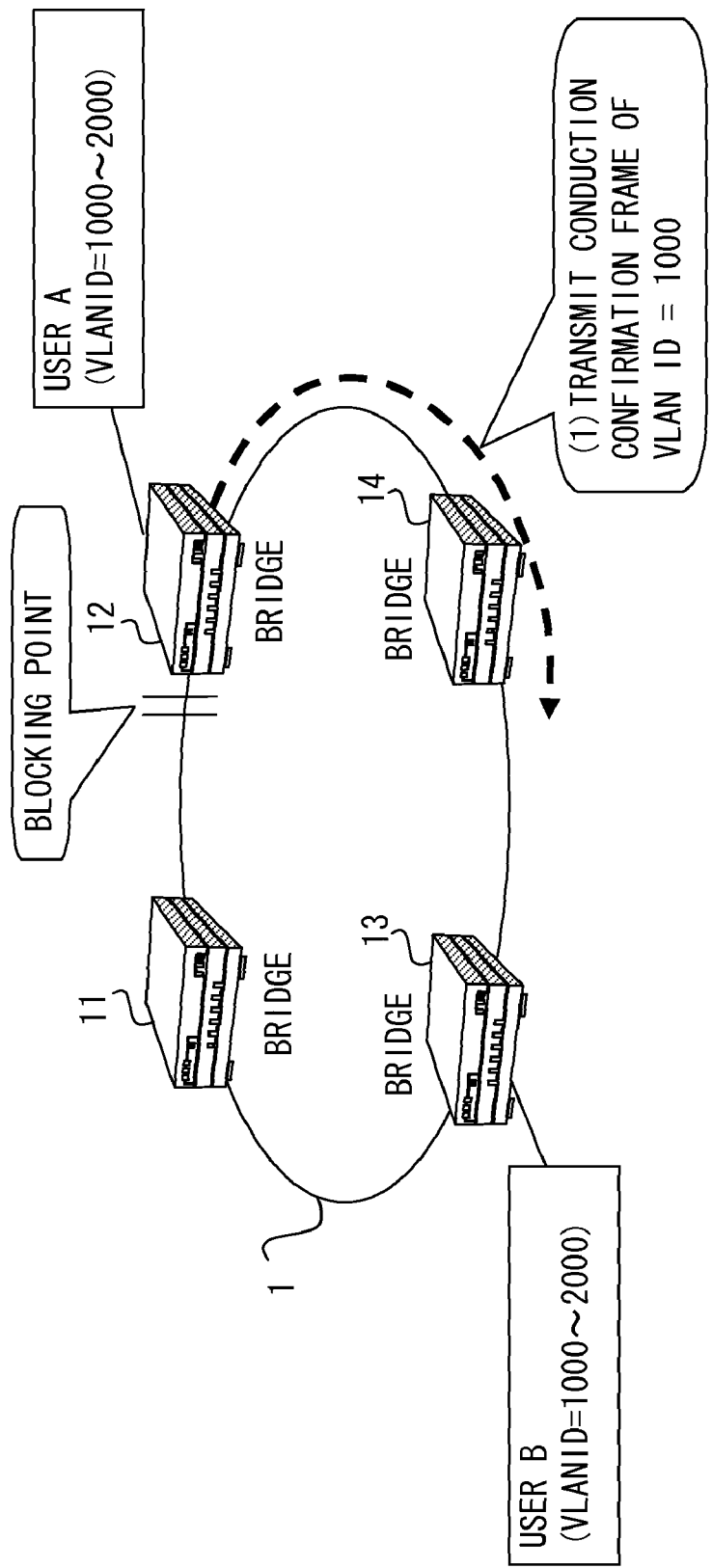
FIG. 1 is a view illustrating an operational outline (1) of a conduction confirmation system in an embodiment.
Figure 2:
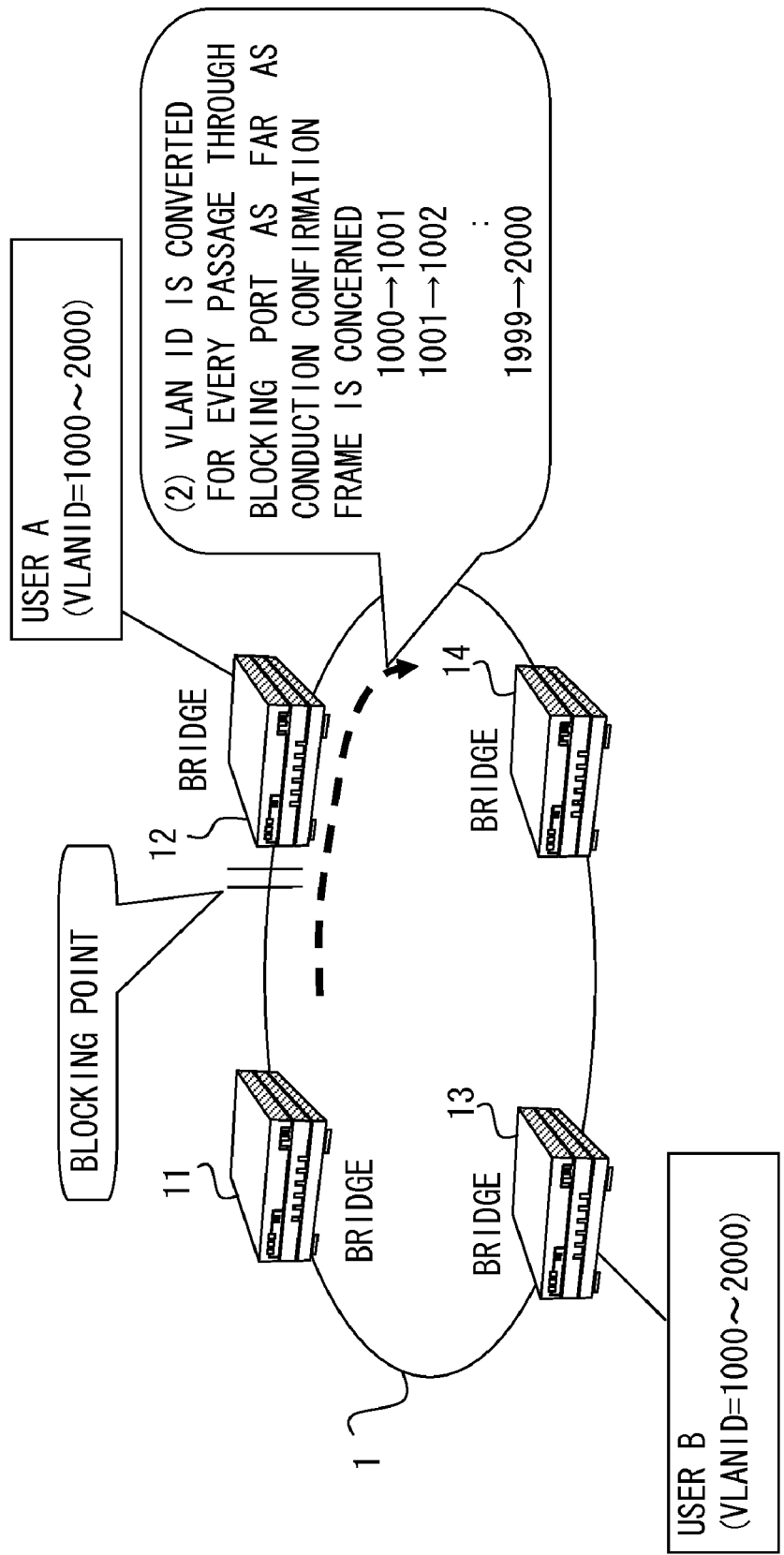
FIG. 2 is a view illustrating an operational outline (2) of the conduction confirmation system in the embodiment.
Figure 3:
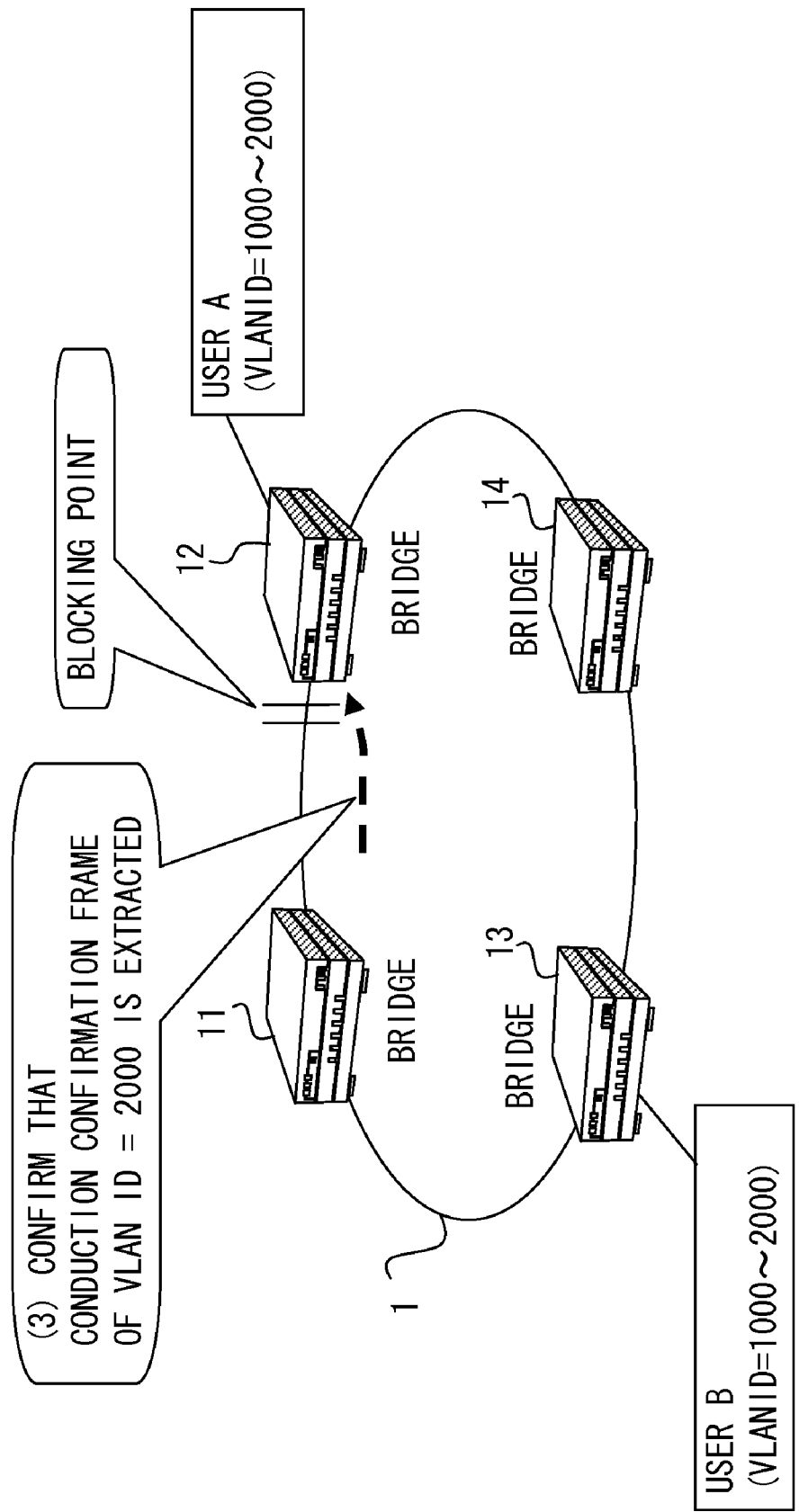
FIG. 3 is a view illustrating an operational outline (3) of the conduction confirmation system in the embodiment.

Herein, an outline of an operation of the conduction confirmation system in the embodiment will be described with reference to FIGS. 1, 2 and 3. FIGS. 1, 2 and 3 are views each illustrating the outline of the operation of the conduction confirmation system in the embodiment.

In the conduction confirmation system in the embodiment, the bridge 12 including a blocking port transmits a predetermined number of conduction confirmation frames from its ring port opposite to the blocking port, thus starting the conduction confirmation. The bridge 12 sets any one VLAN ID (1000) of the VLAN IDs used for the present network in the VLAN ID of the conduction confirmation frame.

As depicted in FIG. 1, the conduction confirmation frame transmitted from the bridge 12 reaches the blocking port of the bridge 12 via a route such as the bridge 14-the bridge 13-the bridge 11. A normal user frame is blocked at this blocking port.

The bridge 12, when receiving the conduction confirmation frame at this blocking port, forwards this conduction confirmation frame to the port opposite to the blocking port without discarding the conduction confirmation frame. The bridge 12, as illustrated in FIG. 2, on the occasion of forwarding, converts the VLAN ID set in the conduction confirmation frame. The bridge 12 resets any one VLAN ID, other than the already-set VLAN ID, among the VLAN IDs used for the network to the conduction confirmation frame, and forwards that. Thus, the predetermined number of conduction confirmation frames are gone around within the ring network 1 in such a way that the bridge 12 sequentially translates the VLAN IDs.

The bridge 12, as illustrated in FIG. 3, receives the same number of conduction confirmation frames as the predetermined number of conduction confirmation frames transmitted at the blocking port, and, when confirming that all of the in-use VLAN IDs have been already set, finishes forwarding the conduction confirmation frames at this point of time. The bridge 12 retains the conduction confirmation frames received at this time. Thus, when the go-around of the conduction confirmation frames with respect to all of the in-use VLAN IDs are completed, the conduction confirmation is completed. As a result, the bridge 12 outputs conduction statuses about all of the VLAN IDs and an abnormal status such as frame proliferation.

Note that a conduction confirmation technique by the bridge 12 is not limited to the technique described above. For example, when forwarding the conduction confirmation frame, the bridge 12 may sequentially retain the VLAN IDs set in the conduction confirmation frames received at the blocking port. Through this contrivance, the bridge 12 confirms that the bridge 12 does not receive more of the conduction confirmation frames than the predetermined number of transmitted conduction confirmation frames in which the same VLAN ID is set. This is because, as described above, the same number of transmitted conduction confirmation frames as the predetermined number of conduction confirmation frames are revolved if the virtual network normally operates, however, there might be a case where the frame proliferation occurs if a loop avoiding operation owing to blocking does not normally function. The bridge 12 specifies the VLAN ID with the occurrence of the abnormal status by performing the confirmation described above.

Configuration of Device

Figure 4:
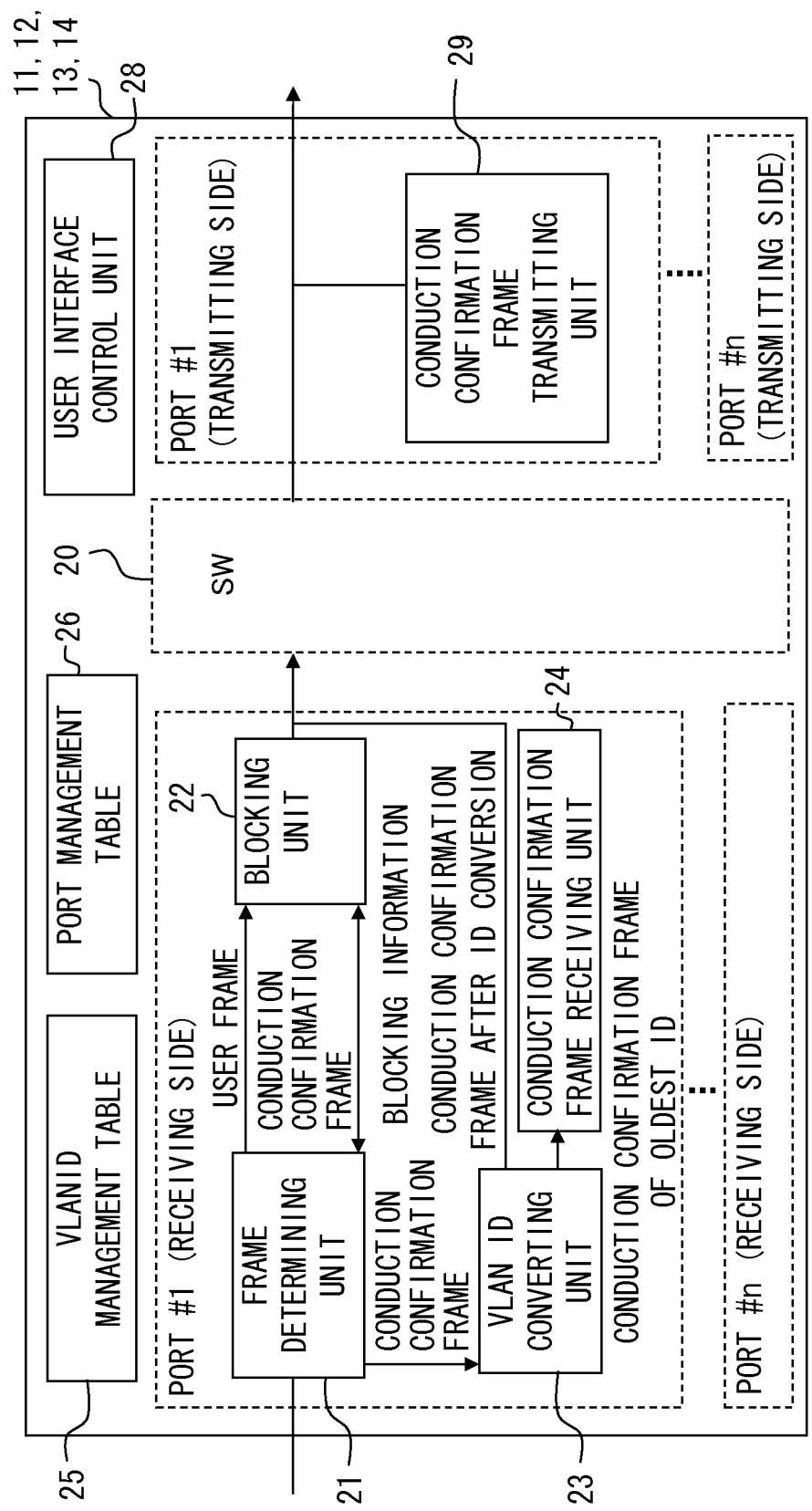
FIG. 4 is a block diagram illustrating an outline of a functional configuration of a bridge apparatus in the embodiment.

Next, configurations of the bridge apparatuses (relay apparatuses) 11, 12, 13 and 14 building up the conduction confirmation system according to the embodiment, will hereinafter be described with reference to FIG. 4. FIG. 4 is a block diagram illustrating an outline of the functional configuration of the bridge apparatus in the embodiment. In the following discussion, unless necessary for any distinctions, the bridges are to be notated without the reference symbols in the case of describing contents common to the bridges 11, 12, 13 and 14. The bridge has, as hardware components, a plurality of input-and-output ports, a physical layer interface, a switch, a CPU (Central Processing Unit), a memory, other input-and-output interfaces, etc. The respective processing units, which will hereinafter be described, may be configured so as to be realized by the CPU that executes a control program stored in the memory etc, and may be configured so that at least one dedicated chip actualizes each of the following processing units. It is noted that the present invention does not limit the hardware configuration of the bridge.

The bridge in the embodiment includes a frame determining unit 21, a blocking unit 22, a VLAN ID converting unit 23, a conduction confirmation frame receiving unit 24, a VLAN ID management table 25, a port management table 26, a user interface control unit 28, a switch unit 20, a conduction confirmation frame transmitting unit 29, etc. An available configuration is that these respective processing units are, as depicted in FIG. 4, provided for every input-and-output port (port #1 through port #n), and another available configuration is that the processing units are provided to enable some plural input-and-output ports or all of the input-and-output ports to be controlled. Each of the function units will hereinafter be described.

The user interface control unit 28 controls the input-and-output port for the user interface, and forms the user interface for inputting a start instruction for the conduction confirmation and setting information and for outputting a result of the conduction confirmation. The user interface is formed as a command line screen displayed to the confirmation user who logs in by use of, e.g., a TELNET protocol. The confirmation user gives an instruction of starting the conduction confirmation by executing a predetermined command from on the command line screen, and refers to a result of the conduction confirmation, which is displayed on this screen.

The user interface control unit 28, when receiving the conduction confirmation start instruction, notifies the conduction confirmation frame transmitting unit 29 of this instruction. The conduction confirmation start instruction may contain information for specifying a VLAN ID group as a conduction confirmation target. The information for specifying the conduction confirmation target VLAN ID group is information from which the VLAN ID taking, e.g., the minimum value in the VLAN ID group is specified.

Upon receiving the conduction confirmation start instruction, the user interface control unit 28 determines, based on the VLAN ID management table 25 that will be explained later on, whether or not the present device has the blocking port with respect to the VLAN ID of the conduction confirmation target. The user interface control unit 28, when determining that the device has none of the blocking port, displays an error on the command line screen. Namely, the conduction confirmation user may examine the bridge in which the blocking port is set with respect to the VLAN ID of the conduction confirmation target VLAN ID and may give the conduction confirmation start instruction to this bridge.

The user interface control unit 28 issues the conduction confirmation instruction and starts time monitoring for the conduction confirmation. The user interface control unit 28, after a predetermined elapse of the time monitoring, refers to the conduction confirmation result retained by the conduction confirmation frame receiving unit 24, and displays this result on the command line screen described above. To be specific, the user interface control unit 28 outputs a result representing a normal status when determining that a reception count retained by the conduction confirmation frame receiving unit 24 is the same as a frame count of the frames transmitted by the conduction confirmation frame transmitting unit 29, and outputs a result representing an abnormal status when determining otherwise. The user interface control unit 28 may, in the case of retaining the reception count with respect to each VLAN ID, output the conduction confirmation result about each VLAN ID.

The VLAN ID management table 25 stores the in-use VLAN ID in the ring network 1 together with an input-output port number utilized for the VLAN ID and a blocking port number set for the VLAN ID. FIG. 5 is a diagram illustrating an example of a structure of the VLAN ID management table. The VLAN ID management table 25 depicted in FIG. 5 stores the in-use VLAN IDs associated with index values each incremented by 1. According to the example in FIG. 5, the in-use VLAN ID is set so as to utilize the ports #1 and #2 of the bridge, and the port #1 in this bridge is set as the blocking port. Note that in the bridge having none of the blocking port, no value is set in a blocking port number field of the VLAN ID management table 25. Further, the using ports of the in-use VLAN IDs may be respectively different with respect to the respective bridges.

The port management table 26 stores the input-and-output ports and the ring network numbers using that, which are associated with each other. FIG. 6 is a diagram illustrating an example of a structure of the port management table 26. A ring opposite port in each bridge can be detected by referring to the port management table 26. In the example of FIG. 6, the bridge is connected to the ring network 1 via the input-and-output ports #1 and #2.

The conduction confirmation frame transmitting unit 29, when receiving the conduction confirmation start instruction from the user interface control unit 28, generates a predetermined number of conduction confirmation frames, and transmits the generated conduction confirmation frames via the ring opposite port to the blocking port. The ring opposite port to the blocking port may be designated by the user together with the conduction confirmation start instruction and may also be automatically detected by referring to the VLAN ID management table 25 on the basis of the conduction confirmation target VLAN ID. Moreover, the number of the conduction confirmation frames to be transmitted may be previously retained adjustably in the memory etc, and a frame count designated by the user may also be received from the user interface control unit 28.

Figure 7:
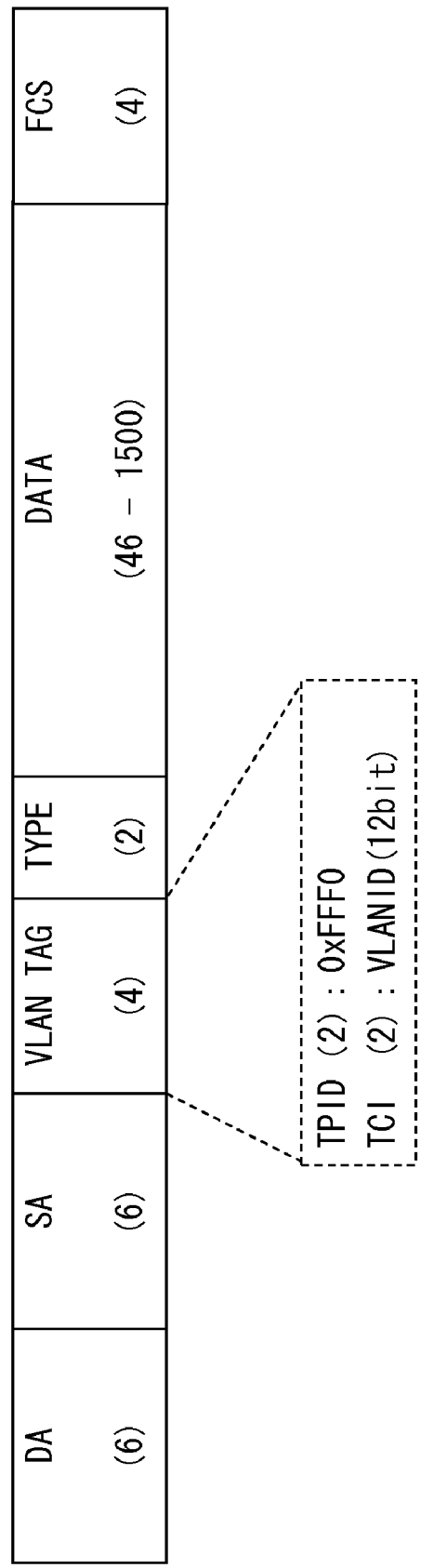
FIG. 7 is a diagram illustrating an example of a format of a conduction confirmation frame.
Figure 13:
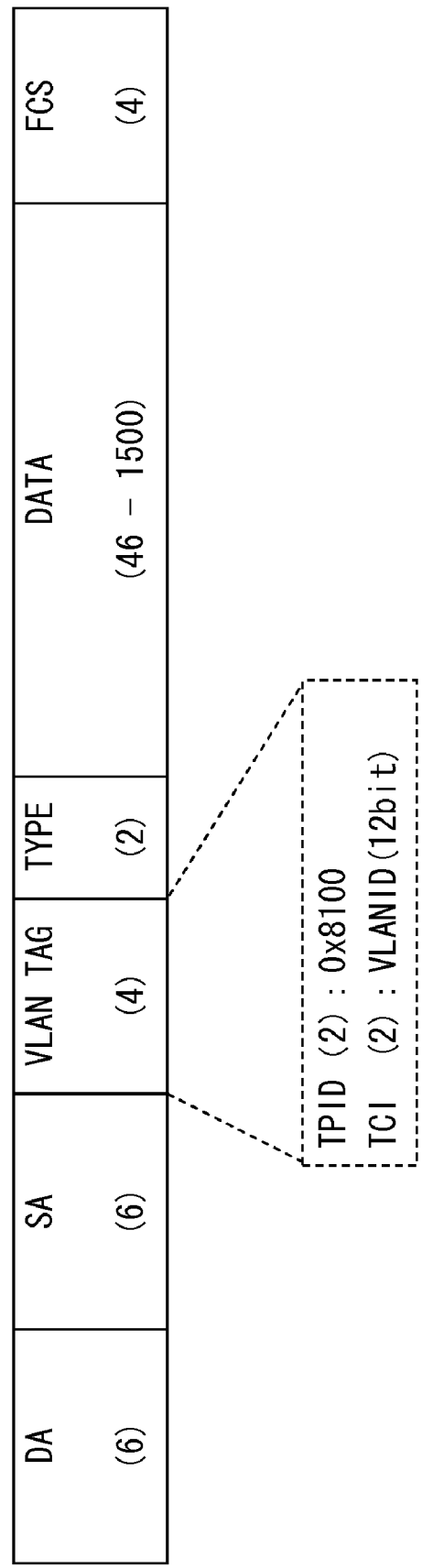
FIG. 13 is a diagram illustrating a frame format of a tag VLAN specified by IEEE802.1Q.

FIG. 7 is a diagram illustrating an example of a format of the conduction confirmation frame. According to the example of FIG. 7, the same format as the normal VLAN tagged frame format depicted in FIG. 13 is used and a type (TP ID) value in the VLAN tag is set to a value (0xFFF0 (hexadecimal) representing the conduction confirmation frame in order to distinguish between the conduction confirmation frame and other frames. Incidentally, if the conduction confirmation frame can be discriminated from other frames, a predetermined reservation value representing the conduction confirmation frame may be set in an arbitrary field other than an FCS (Frame Check Sequence) field. Further, the present invention does not limit any values set in other fields of the conduction confirmation frame.

The frame determining unit 21 receives the frame (Ethernet (registered trademark) frame) inputted via the physical layer interface, the layer-2 interface, etc from the predetermined input-and-output port, and determines whether the received frame is the conduction confirmation frame or not. The frame determining unit 21 determines whether the received frame is the conduction confirmation frame or not by referring to the value (e.g., the type value in the VLAN tag) set for specifying the conduction confirmation frame. The frame determining unit 21, when determining that the received frame is a general type of user frame other than the conduction confirmation frame, sends this frame to the blocking unit 22.

The frame determining unit 21, when determining that the received frame is the conduction confirmation frame, queries the blocking unit 22 about whether the input-and-output port via which to receive the conduction confirmation frame is the blocking port or not. The frame determining unit 21, if the input-and-output port is not the blocking port, transmits the conduction confirmation frame to the blocking unit 22. Whereas if the input-and-output port is the blocking port, the frame determining unit 21 transmits the conduction confirmation frame to the VLAN ID converting unit 23.

Herein, the frame determining unit 21, when receiving the conduction confirmation frame and if the input-and-output port is not the blocking port, may retain the VLAN ID set in the conduction confirmation frame. Moreover, the frame determining unit 21 may simultaneously retain the number of receptions of the conduction confirmation frames in which the same VLAN ID is set. The thus-retained data is transmitted to the conduction confirmation frame receiving unit 24 via the VLAN ID converting unit 23. With this contrivance, the conduction confirmation frame receiving unit 24 can specify the VLAN ID with the occurrence of the abnormal status such as the frame proliferation.

The VLAN ID converting unit 23 receives the conduction confirmation frame transmitted from the frame determining unit 21, and converts the VLAN ID set in this conduction confirmation frame in the following manner. The VLAN ID converting unit 23 extracts the index value associated with the VLAN ID set in the conduction confirmation frame by searching the VLAN ID management table 25. The VLAN ID converting unit 23 again extracts, from the VLAN ID management table 25, the VLAN ID associated with the index value into which "1" is added to the acquired index value, and changes the VLAN ID of the conduction confirmation frame with this extracted VLAN ID. The conduction confirmation frame with the converted VLAN ID is transmitted to the switch unit 20.

On the other hand, the VLAN ID converting unit 23, if the extracted VLAN ID represents an end flag (0xFFFF), determines that the check of all of the in-use VLAN IDs is completed, and transmits the conduction confirmation frame to the conduction confirmation frame receiving unit 24 without converting the VLAN ID.

The conduction confirmation frame receiving unit 24, when receiving the last conduction confirmation frame which is confirmed the conduction about the VLAN ID being used, counts the number of receptions of the conduction confirmation frames, and retains the reception count as a result of the conduction confirmation. The conduction confirmation frame receiving unit 24, in the case of receiving the reception count about each VLAN ID from the frame determining unit 21, retains those as a result of the conduction confirmation.

Operational Example

Figure 8:
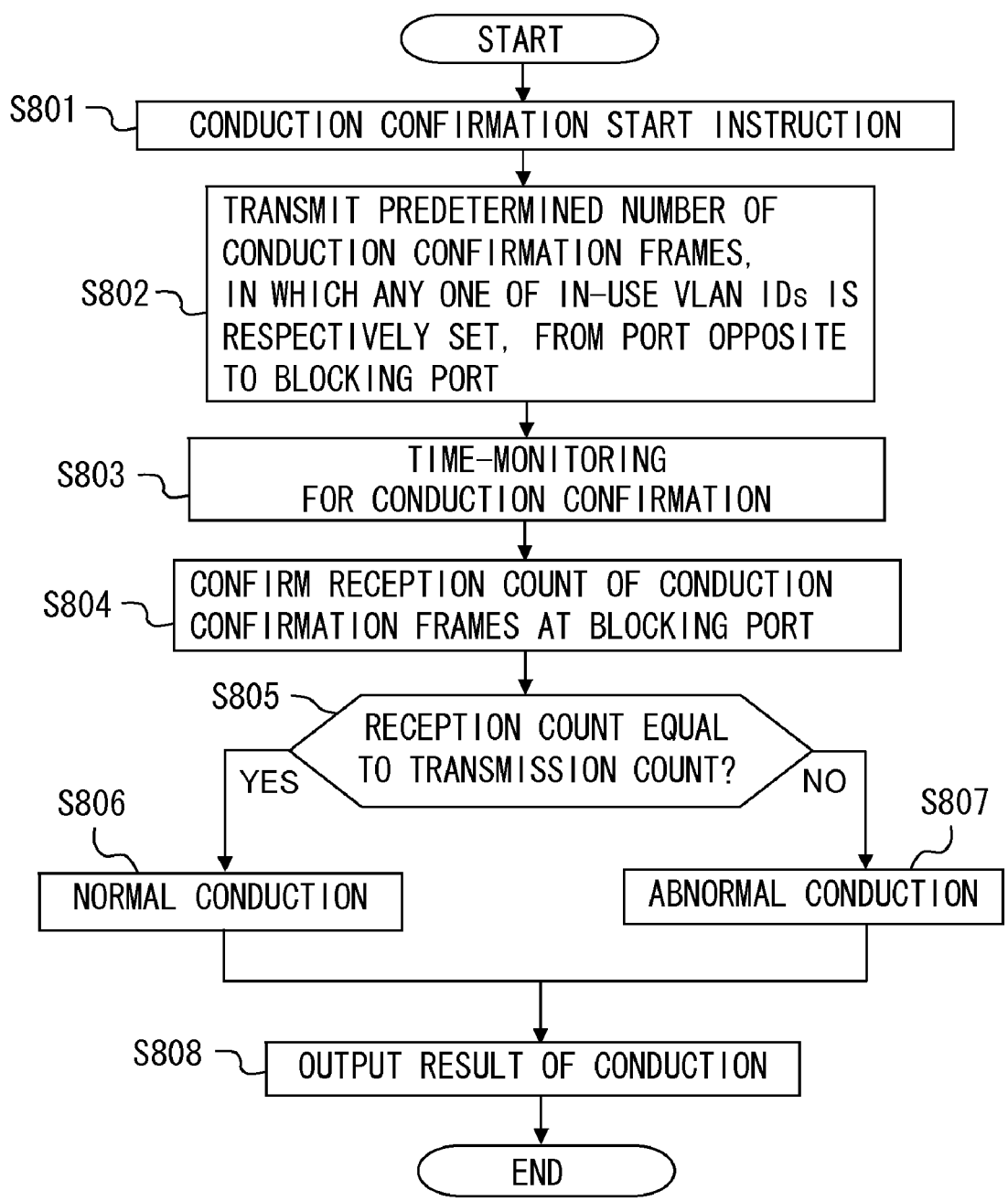
FIG. 8 is a flowchart illustrating a conduction confirmation process in the bridge in the embodiment.
Figure 9:
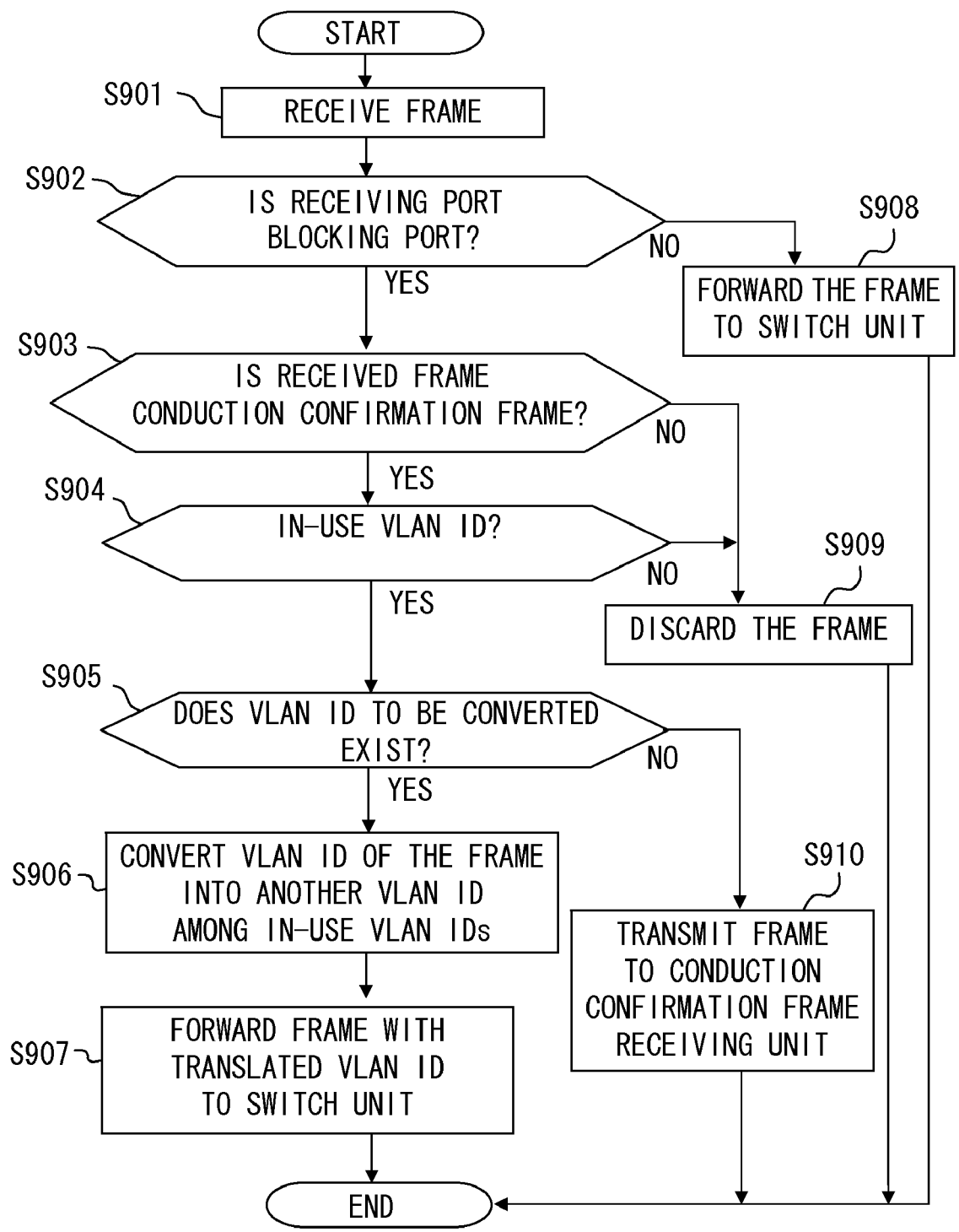
FIG. 9 is a flowchart illustrating a process at a frame receiving time in the bridge in the embodiment.

An operation of the conduction confirmation system in the embodiment will hereinafter be described with reference to FIGS. 8 and 9. At first, an outline of a conduction confirmation process in the bridge according to the embodiment will hereinafter be described with reference to FIG. 8. FIG. 8 is a flowchart illustrating the conduction confirmation process in the bridge in the embodiment.

Figure 12:
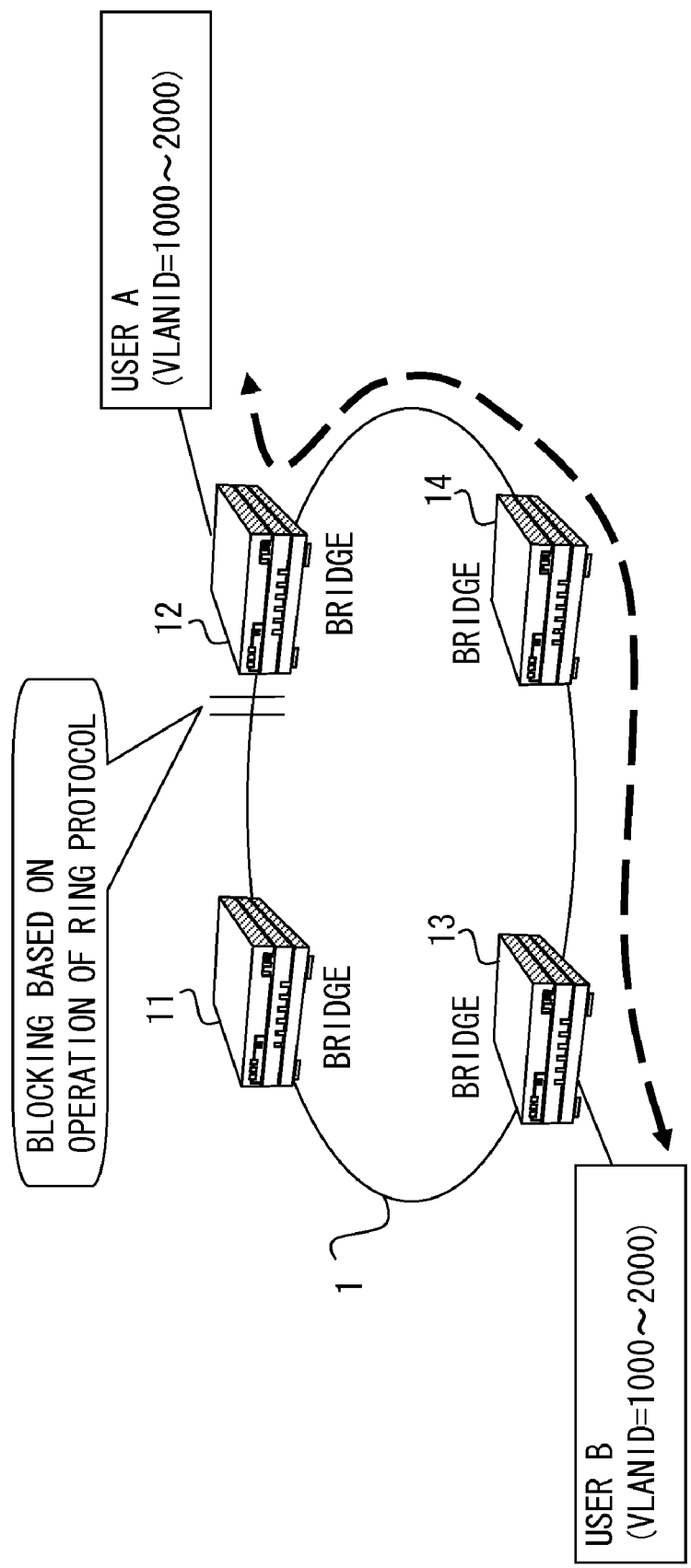
FIG. 12 is a diagram illustrating an operational example of a ring protocol.

In the network configuration depicted in FIG. 12, the user interface control unit 28 in the bridge 12 having the blocking port receives the conduction confirmation start instruction of the user from on the command line screen etc (S801).

The conduction confirmation frame transmitting unit 29, upon receiving this conduction confirmation start instruction, acquires the blocking port with respect to the VLAN ID of the conduction confirmation target from the VLAN ID management table 25. The conduction confirmation frame transmitting unit 29 acquires the ring port opposite to this blocking port from the port management table 26, and transmits the predetermined number of conduction confirmation frames via this opposite ring port (S802). The conduction confirmation frame transmitting unit 29 sets, in this conduction confirmation frame, the VLAN ID associated with the minimum index value among the in-use VLAN IDs set in the VLAN ID management table 25.

The user interface control unit 28 starts the time monitoring for the conduction confirmation after transmitting the conduction confirmation start instruction (S803). The user interface control unit 28, after an elapse of a predetermined period of time monitoring, acquires the conduction confirmation result retained in the conduction confirmation frame receiving unit 24 (S804). The user interface control unit 28 determines whether or not the reception count of the conduction confirmation frames that is retained as the conduction confirmation result is equal to the number of transmissions by the conduction confirmation frame transmitting unit 29 (S805). If the reception count is equal to the transmission count (S805; YES), the user interface control unit 28 determines that the conduction is normal (S806). Whereas if the reception count is not equal to the transmission count (S805; NO), the user interface control unit 28 determines that the conduction is abnormal (S807). The user interface control unit 28 displays the result of this determination as the conduction confirmation result on the command line screen etc. (S808).

Next, a process when receiving the frame in the bridge according to the embodiment will hereinafter be described with reference to FIG. 9. FIG. 9 is a flowchart illustrating the process when receiving the frame in the bridge in the embodiment.

When receiving the frame in the bridge according to the embodiment, the received frame is transmitted to the frame determining unit 21 via the physical layer interface, the layer-2 interface, etc from the received input-and-output port (S901).

The frame determining unit 21 determines whether or not the reception port is the blocking port with respect to the VLAN ID set in the VLAN tag field of the received frame (S902). On the occasion of this determination, the frame determining unit 21 queries the blocking unit 22 about the blocking port information. The frame determining unit 21, when determining that this reception port is not the blocking port (S902; NO), transmits the frame to the switch unit 20 (S908). The switch unit 20 performs the control so that the frame is transmitted from the ring port opposite to the reception port via the layer-2 interface, the physical layer interface, etc.

The frame determining unit 21, when judging that the reception port is the blocking port (S902; YES), determines whether or not this frame is the conduction confirmation frame (S903). Specifically, the frame determining unit 21 determines whether or not the value representing the conduction confirmation frame is set in the type value in the VLAN tag field of this frame, thereby judging whether the frame is the conduction confirmation frame or not.

The frame determining unit 21, when deciding that this frame is the conduction confirmation frame (S903; YES), further determines whether or not the VLAN ID set in the conduction confirmation frame is the in-use VLAN ID (S904). This determination involves referring to the VLAN ID management table 25. The frame determining unit 21, if the frame is determined not to be the conduction confirmation frame (S903; NO), transmits the frame to the blocking unit 22. The blocking unit 22, because of the reception port of the frame being the blocking port, discards this frame (S909). Further, the frame determining unit 21, when determining that the VLAN ID set in the conduction confirmation frame is not the in-use VLAN ID (S904; NO), discards the conduction confirmation frame (S909).

The frame determining unit 21, when determining that the VLAN ID set in the conduction confirmation frame is the in-use VLAN ID (S904; YES), sends the conduction confirmation frame to the VLAN ID converting unit 23. The VLAN ID converting unit 23 refers to the VLAN ID management table 25 and thus determines whether or not there still exists a VLAN ID into which the VLANID set in the conduction confirmation frame is converted (S905). Namely, the VLAN ID converting unit 23 determines whether or not the conduction confirmation frame is revolved for all of the in-use VLAN IDs.

The VLAN ID converting unit 23, when determining that the VLAN ID to be converted does not exist (S905; NO), transmits the conduction confirmation frame to the conduction confirmation frame receiving unit 24 (S910). The conduction confirmation frame receiving unit 24 stops forwarding but retains the conduction confirmation frames, and simultaneously retains the number of receptions of the conduction confirmation frames.

The VLAN ID converting unit 23, when deciding that the VLAN ID to be converted still exists (S905; YES), extracts the VLAN ID from the VLAN ID management table 25, and sets the extracted VLAN ID in the conduction confirmation frame (S906). The VLAN ID converting unit 23 transmits the conduction confirmation frame of which the VLAN ID is converted to the switch unit 20 (S907). The conduction confirmation frame is thereby transmitted from the switch unit 20 via the ring port opposite to the reception port thereof.

Operation and Effect of Embodiment

In the conduction confirmation system according to the embodiment, the conduction confirmation frame is sequentially forwarded by the respective bridges 11, 12, 13 and 14, and is gone around the ring network 1, thereby performing the conduction confirmation of the ring network 1. At this time, any one of the in-use VLAN IDs is set in the conduction confirmation frame, and the conduction confirmation frame is transmitted from the ring opposite port, to the blocking port, of the bridge 12 having the blocking port of the in-use VLAN ID.

The transmitted conduction confirmation frame is forwarded by the respective bridges 14, 13, 11 sequentially and received at the blocking port of the sender bridge 12. The conduction confirmation frame reaching the blocking port of the bridge 12 is, after the VLAN ID thereof has been converted into another VLAN ID of the in-use VLAN IDs, transmitted again from the ring opposite port.

Hence, according to the conduction confirmation system in the embodiment, the conduction confirmation can be done for all of the in-use VLAN IDs. Moreover, during this confirming test, the bridge including the blocking port sequentially generates the conduction confirmation frames of which the VLAN ID is translated into the in-use VLAN ID, thereby enabling the user to have a far less number of steps required for the confirming test simply by giving the start instruction.

Further, in the conduction confirmation system according to the embodiment, the conduction confirmation frame is generated to have the same frame format as the tag VLAN frame format. This scheme enables the same conduction confirming test can be conducted even when the conduction confirmation system includes the standard bridges other than the bridges according to the embodiment.

Moreover, in the bridge according to the embodiment, the respective in-use VLAN IDs are managed in the way of being associated with the index values in the VLAN ID management table. With this management, the proper VLAN ID to be converted can be acquired simply by adding 1 to the index value on the occasion of translating the VLAN ID. Furthermore, the conduction confirmation can be adequately carried out for all of the in-use VLAN IDs.

Supplement

Note that the embodiment discussed above has exemplified the instance in which the blocking ports of all of the in-use VLAN IDs are set in the same ports of the same bridge 12, but can be also carried out in the same way as given in the above discussion according to the conduction confirmation system in the embodiment even in such a case that the blocking ports are set in different ports of the bridges which are different on every predetermined group in all of the in-use VLAN IDs.

In this case, in each bridge having the blocking port, the different in-use VLAN IDs may be managed in the VLAN ID management table 25. The conduction confirmation frame is each transmitted from the port opposite to the blocking port of each bridge having the blocking port in the individual VLAN ID group.

First Modified Example

The embodiment has been discussed based on the example of the VLAN ID management table 25 illustrated in FIG. 5. The VLAN ID management table 25 is not limited to this example but may have a structure as illustrated in FIG. 10. FIG. 10 is a diagram depicting a modified example of the VLAN ID management table.

In the example of FIG. 10, the VLAN ID management table 25 has records in which all of the VLAN IDs (1 through 4094) that can be set by the system are set, where using flags are set on each VLAN-ID. When the in-use VLAN IDs range from 1000 through 2000, a value (1) representing the in-use status is set in a using flag field of each of the records in which the VLAN ID field is set any one of 1000 through 2000.

When the VLAN ID management table 25 illustrated in FIG. 10 is provided, it may be sufficient that the VLAN ID converting unit 23 executes the VLAN ID translation process in the following manner. The VLAN ID converting unit 23 searches the VLAN ID management table 25 by using the VLAN ID set in the conduction confirmation frame as the index value. The conduction confirmation frame is discarded if the value in the using flag field of the extracted record is 0

(not used), and 1 is added to the VLAN ID if the value in the using flag field is 1 (in-use). The VLAN ID management table 25 is again searched with the 1-added VLAN ID serving as the index value, and the value in the using flag field of the extracted record is acquired. This process is repeated till the record containing 1 (in-use) in the using flag field is acquired, and the VLAN ID of the conduction confirmation frame is translated into the value in the VLAN ID field of the extracted record. If any record of which the using flag field is set to "1" is not extracted even by searching down to the last record (VLAN ID=4094), the VLAN ID translation is considered to be finished, and the conduction confirmation frame is transmitted to the conduction confirmation frame receiving unit 24 without performing the VLAN ID translation.

Another Modified Example

Figure 11:
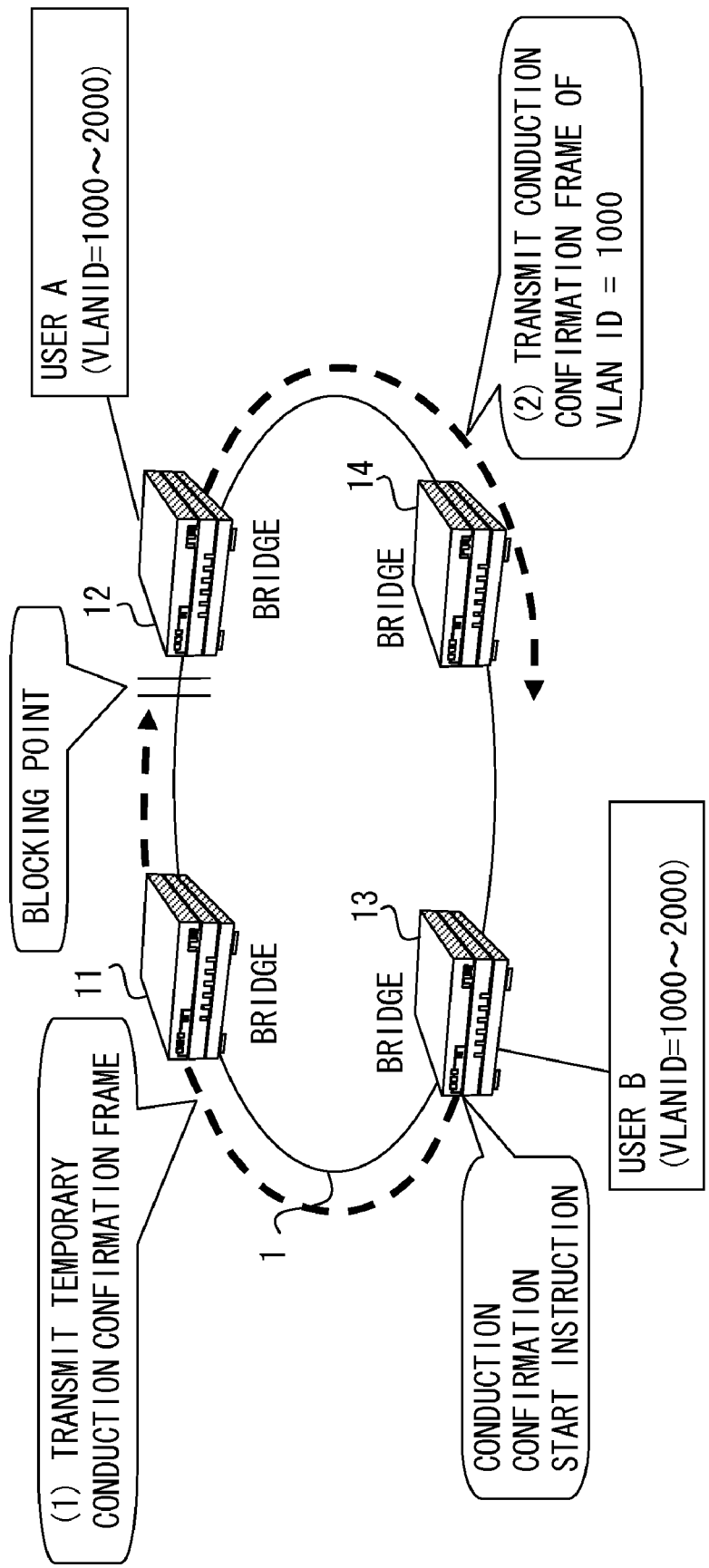
FIG. 11 is a diagram illustrating an operational outline in the modified example of the conduction confirmation system in the embodiment.

In the embodiment discussed above, the conduction confirmation start instruction is made in the bridge having the blocking port with respect to the conduction confirmation target VLAN ID, however, the conduction confirmation start instruction may also be made in the bridge having none of the blocking port. FIG. 11 is a view illustrating an outline of an operation of the modified example of the conduction confirmation system in the embodiment.

In this modified example, the conduction confirmation frame transmitting unit 29, when detecting that the device itself has no blocking port with respect to the conduction confirmation target VLAN ID by referring to the VLAN ID management table 25 etc, transmits a temporary conduction confirmation frame in which a value representing the conduction confirmation frame transmitted from the bridge having no blocking port is set. This value may also be set as, e.g., the type (TP ID) value in the VLAN tag.

In this modified example, the bridge receiving this type of conduction confirmation frame may simply execute a frame receiving process as below. The frame determining unit 21, when determining that the reception port is the blocking port and that the frame is the conduction confirmation frame transmitted from the bridge having no blocking port, transmits the frame to the VLAN ID converting unit 23. The VLAN ID converting unit 23, when detecting that the frame is the conduction confirmation frame transmitted from the bridge having no blocking port, sets the VLAN ID, to be first set, of the in-use VLAN IDs in this frame. The VLAN ID converting unit 23 transmits, to the switch unit 20, the conduction confirmation frame as the frame from which the value representing the normal conduction confirmation frame, i.e., the conduction confirmation frame transmitted from the bridge having no blocking port is deleted.

This contrivance enables the conduction confirmation user to give the conduction confirmation start instruction from any one bridge without examining the bridge having the blocking port with respect to the conduction confirmation target VLAN ID. Accordingly, the conduction confirming test can be carried out more efficiently.

The embodiments discussed above may further include following configurations. Modes disclosed in respective configurations can be combined to the greatest possible degree as the necessity arises.

A relay apparatus, which relays frames in which a plurality of network identifiers for identifying a plurality of virtual networks are set in order to configure the plurality of virtual networks, comprises: a frame determining unit to determine whether a frame received at a communication port is a specified frame or not; a converting unit to convert, when determining that the received frame is the specified frame and that the communication port is a blocking port, the network identifier set in the specified frame into another network identifier of the plurality of network identifiers; and a transmitting unit to transmit the specified frame, the network identifier of which has been converted by the converting unit from a port opposite to the communication port.

Herein, the specified frame represents a frame used for performing a conduction confirmation. Further, the virtual network connotes a network realized by, e.g., a VLAN technology, and the network identifier represents, e.g., a VLAN ID. According to the configuration, when the specified frame is received at the blocking port, the specified frame, the network identifier representing an not-set virtual network among the plurality of configured virtual networks of which is set, is sequentially transmitted from the port opposite to the blocking port.

With this scheme, the specified frame, in which the network identifier of each virtual network is set, sequentially is gone around the network, and therefore the network conduction confirmation for all of the virtual networks can be done. Moreover, this conduction confirmation can be carried out as long as the relay apparatus according to the configuration is disposed in the networks, which is effective.

Further, in the relay apparatus, preferably the converting unit further includes a management table to manage the plurality of network identifiers, and acquires, when converting the network identifier set in the specified frame, another network identifier that is not yet set among the specified frame from the management table.

With this scheme, on the occasion of conducting the conduction confirmation for all of the virtual networks, it is feasible to easily grasp which network identifier would be set in the specified frame.

Still further, in the relay apparatus, preferably, the converting unit, when determining by referring to the management table that another identifier, which is not yet set in the specified frame, does not exist, finishes transmitting the specified frame from the transmitting unit.

With this scheme, it is possible to easily grasp an end of the conduction confirmation for all of the virtual networks.

Yet further, preferably the relay apparatus further comprises: a port confirming unit to confirm existence of the blocking port when receiving a start instruction of transmitting the specified frame; and a frame generating unit to newly generate, when the port confirming unit confirms the existence of the blocking port, the specified frame in which any one of the plurality of network identifiers is set, wherein the transmitting unit transmits the specified frame generated by the frame generating unit from the port opposite to the blocking port.

According to the configuration, in the relay apparatus having the blocking port, the specified frame begins to be transmitted from the opposite port and is received at the blocking port of the relay apparatus.

With this scheme, the specified frame is gone around the whole conduction confirmation target network, and hence the link conduction of the whole network can be surely confirmed.

Yet further, in the relay apparatus, preferably the frame generating unit generates a predetermined number of the specified frames, and the converting unit includes: a counting unit to count the number of the specified frames in which the same network identifier is set in a way that retains the network identifiers set in the received specified frames; and a determining unit to determine, if the number of the specified frames, which is counted by the counting unit, is equal to the predetermined number of the specified frames, that the conduction is normal.

According to the configuration, the determination about whether the conduction is normal or abnormal is made based on whether or not the transmission count of the specified frames is equal to the reception count of the specified frames at the blocking port.

With this scheme, it is possible to detect frame proliferation in a case where a loop avoiding operation etc by blocking does not normally operate and to properly perform the conduction confirmation.

Moreover, in the relay apparatus, preferably the frame generating unit generates, if the port confirming unit confirms that any blocking port does not exist, a temporary specified frame distinguishable from the specified frame, and the transmitting unit transmits the temporary specified frame generated by the frame generating unit from a predetermined port.

With this scheme, a transmission start instruction of the specified frame can be given to the relay apparatus other than the relay apparatus having the blocking port, whereby the conduction confirmation can be effectively started.

It would be noted that the configuration may also be a program for making the relay apparatus realize any one of the elements described above, may further be a readable-by-computer storage medium storing this program, and may also be a conduction confirmation circuit in the relay apparatus which realizes any one of the elements described above. Moreover, the configuration may also be a conduction confirmation method by which any one of the elements described above is executed on the relay apparatus.

According to the configuration, it is possible to provide the relay apparatus which effectively confirms the conduction status of the plurality of virtual networks.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it would be understood that the various changes, substitutions, and alterations could be made hereto without departing from the spirit and scope of the invention.

What is claimed is:

1. A relay apparatus that relays frames in which a plurality of network identifiers for identifying a plurality of virtual networks are set in order to configure the plurality of virtual networks, the relay apparatus comprising:
   a frame determining unit to determine whether a frame received at a communication port is a specified frame or not;
   a converting unit to convert, when determining that the received frame is the specified frame and that the communication port is a blocking port, the network identifier set in the specified frame into another network identifier of the plurality of network identifiers; and
   a transmitting unit to transmit the specified frame, the network identifier of which is converted by the converting unit, from a port opposite to the communication port.

2. A relay apparatus according to claim 1, wherein the converting unit further includes a management table to manage the plurality of network identifiers, and acquires, when converting the network identifier set in the specified frame, another network identifier that is not yet set in the specified frame from the management table.

3. A relay apparatus according to claim 2, wherein the converting unit, when determining that the another network identifier, which is not yet set in the specified frame, does not exist by referring to the management table, finishes transmitting the specified frame from the transmitting unit.

4. A relay apparatus according to claim 1, further comprising:
   a port confirming unit to confirm existence of the blocking port when receiving a start instruction of transmitting the specified frame; and
   a frame generating unit to newly generate, when the port confirming unit confirms the existence of the blocking port, the specified frame in which any one of the plurality of network identifiers is set,
   wherein the transmitting unit transmits the specified frame generated by the frame generating unit from a port opposite to the blocking port.

5. A relay apparatus according to claim 4, wherein the frame generating unit generates a predetermined number of the specified frames, and
   the converting unit includes:
   a counting unit to count the number of the specified frames in which the same network identifier is set by retaining the network identifiers set in the received specified frames; and
   a determining unit to determine, if the number of the specified frames, which is counted by the counting unit, is equal to the predetermined number of the specified frames, that the conduction is normal.

6. A relay apparatus according to claim 4, wherein the frame generating unit generates, if the port confirming unit confirms that any blocking port does not exist, a temporary specified frame distinguishable from the specified frame, and
   the transmitting unit transmits the temporary specified frame generated by the frame generating unit from a predetermined port.

7. A conduction confirmation method executed in a relay apparatus which relays frames in which a plurality of network identifiers for identifying a plurality of virtual networks are set in order to configure the plurality of virtual networks, the conduction confirmation method comprising:
   determining whether a frame received at a communication port of the relay apparatus is a specified frame or not;
   converting, when determining that the received frame is the specified frame and that the communication port is a blocking port, the network identifier set in the specified frame into another network identifier of the plurality of network identifiers; and
   transmitting the specified frame, the network identifier of which is converted, from a port opposite to the communication port.

8. A conduction confirmation circuit in a relay apparatus which relays a frame in which any one of a plurality of network identifiers for identifying each of a plurality of virtual networks is set in order to configure the plurality of virtual networks, the conduction confirmation circuit comprising:
- a frame determining unit to determine whether a frame received at a communication port within the relay apparatus is a specified frame or not;
- a converting unit to convert, when determining that the received frame is the specified frame and that the communication port is a blocking port, the network identifier set in the specified frame into another network identifier of the plurality of network identifiers; and
- a transmitting unit to transmit the specified frame, the network identifier of which is converted by the converting unit, toward a switch circuit within the relay apparatus so that the specified frame is transmitted from a port opposite to the communication port.

* * * * *